United States Patent
Mojica De La Vega et al.

(10) Patent No.: US 12,353,998 B2
(45) Date of Patent: Jul. 8, 2025

(54) MULTI-TASK SEQUENCE TAGGING WITH INJECTION OF SUPPLEMENTAL INFORMATION

(71) Applicant: Microsoft Technology Licensing, LLC, Redmond, WA (US)

(72) Inventors: Luis Gerardo Mojica De La Vega, Redmond, WA (US); Qiang Lou, Sammamish, WA (US); Jian Jiao, Bellevue, WA (US); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 898 days.

(21) Appl. No.: 17/534,421

(22) Filed: Nov. 23, 2021

(65) Prior Publication Data
US 2023/0162020 A1    May 25, 2023

(51) Int. Cl.
*G06N 3/08*     (2023.01)
*G06F 16/93*    (2019.01)
(Continued)

(52) U.S. Cl.
CPC ............. *G06N 3/08* (2013.01); *G06F 16/93* (2019.01); *G06N 3/045* (2023.01); *G06N 3/063* (2013.01)

(58) Field of Classification Search
CPC .. G06F 16/93; G06F 16/538; G06F 16/90335; G06F 40/177; G06F 16/2237;
(Continued)

(56) References Cited

U.S. PATENT DOCUMENTS 9,600,764 B1 *   3/2017   Rastrow ................. G06N 3/049
11,042,700 B1 *  6/2021   Walters ................. G06F 40/169
(Continued)

FOREIGN PATENT DOCUMENTS

CA     3172730 A1 *   9/2021   ......... G06F 16/2237
CN    111191001 A  *   5/2020   ......... G06F 16/3344
(Continued)

OTHER PUBLICATIONS

Search Report and Written Opinion for PCT/US2022/041607, mailed Dec. 7, 2022, 18 pages.
(Continued)

*Primary Examiner* — Steven P Sax

(57) ABSTRACT

A tagging system appends supplemental information to an original sequence of items, to produce a supplemented sequence of items. The tagging system includes a transformer-based encoder neural network that maps the supplemented sequence into hidden state information. The tagging system includes a post-processing neural network that transform the hidden state information into a tagged output sequence of items. That is, each item in the tagged output sequence includes a tag that identifies its entity class or some other characteristic. The tagging system can increase the accuracy of the tags it produces by virtue of the inclusion of the supplemental information added to each original sequence. A training system trains the tagging system to perform plural tasks, which further increases the accuracy of the tags it produces. The training system may commence training of the tagging system using a pre-trained model for the encoder neural network.

18 Claims, 8 Drawing Sheets

(51) Int. Cl.
   *G06N 3/045*   (2023.01)
   *G06N 3/063*   (2023.01)
(58) Field of Classification Search
   CPC ...... G06F 18/214; G06F 16/635; G06F 16/40;
           G06F 16/245; G06F 16/248; G06F
           16/9537; G06F 3/044; G06N 3/08; G06N
           3/045; G06N 3/063; G06N 20/20; G06N
           20/00; G06N 20/10; G06N 3/04; G06N
           40/169; G06N 3/049; G06N 5/022; G06Q
           10/067; G06Q 30/0623; G06Q 40/08;
           G06Q 10/04; G10L 15/22; A01G 7/045;
                                    G16H 70/40
   See application file for complete search history.

(56) References Cited

U.S. PATENT DOCUMENTS

| | | | | |
|---|---|---|---|---|
| 11,361,151 | B1 * | 6/2022 | Guberman | G06N 3/08 |
| 12,141,732 | B1 * | 11/2024 | Solmer | G06Q 10/067 |
| 2010/0256969 | A1 | 10/2010 | Li et al. | |
| 2016/0180247 | A1 | 6/2016 | Li et al. | |
| 2017/0337202 | A1 | 11/2017 | Arya et al. | |
| 2020/0273449 | A1 * | 8/2020 | Kumar | G06F 16/635 |
| 2020/0285916 | A1 * | 9/2020 | Wang | G06F 16/90335 |
| 2020/0320988 | A1 * | 10/2020 | Rastogi | G10L 15/22 |
| 2020/0349180 | A1 | 11/2020 | Kempf et al. | |
| 2020/0356592 | A1 * | 11/2020 | Yada | G06F 16/538 |
| 2020/0394455 | A1 * | 12/2020 | Lee | G06N 20/00 |
| 2021/0042366 | A1 * | 2/2021 | Hicklin | G06N 3/08 |
| 2021/0286989 | A1 * | 9/2021 | Zhong | G06F 40/177 |
| 2021/0390392 | A1 * | 12/2021 | Lagos | G06N 3/08 |
| 2022/0012296 | A1 * | 1/2022 | Marey | G06N 20/00 |
| 2022/0138402 | A1 * | 5/2022 | Kraus | G06N 3/08 715/269 |
| 2022/0284261 | A1 * | 9/2022 | Lillo | G06N 3/04 |

FOREIGN PATENT DOCUMENTS

| | | | | | |
|---|---|---|---|---|---|
| CN | 109446338 | B | * | 7/2020 | ............ G16H 70/40 |
| CN | 113408721 | A | * | 9/2021 | |
| CN | 109933682 | B | * | 1/2022 | |
| CN | 113971743 | A | * | 1/2022 | ........... G06F 18/214 |
| CN | 109558966 | B | * | 5/2022 | ............. G06N 3/08 |
| CN | 113901228 | B | * | 12/2022 | |
| CN | 116547474 | A | * | 8/2023 | ............ A01G 7/045 |
| CN | 111461229 | B | * | 10/2023 | ............. G06F 18/24 |
| WO | WO-2017124116 | A1 | * | 7/2017 | |

OTHER PUBLICATIONS

Alammar, Jay, "The Illustrated Transformer," available at http://jalammar.github.io/illustrated-transformer/, Github, Jun. 27, 2018, 23 pages.

Wu, et al., "Google's Neural Machine Translation System: Bridging the Gap between Human and Machine Translation," in arXiv e-print, arXiv: 1609.08144v2 [cs.CL], Oct. 8, 2016, 23 pages.

Devlin, et al., "BERT: Pre-training of Deep Bidirectional Transformers for Language Understanding," in arXiv e-print, arXiv: 1810.04805v2 [cs.CL], May 24, 2019, 16 pages.

Liu, et al., "ROBERTa: A Robustly Optimized BERT Pretraining Approach," in arXiv e-print, arXiv:1907.11692v1 [cs.CL], Jul. 26, 2019, 13 pages.

Viswani, et al., "Attention Is All You Need," in arXiv e-print, arXiv:1706.03762v5 [cs.CL], Dec. 6, 2017, 15 pages.

Yadav, e al., "A Survey on Recent Advances in Named Entity Recognition from Deep Learning Models," in Proceedings of the 27th International Conference on Computational Linguistics, Aug. 2018, pp. 2145-2158.

* cited by examiner

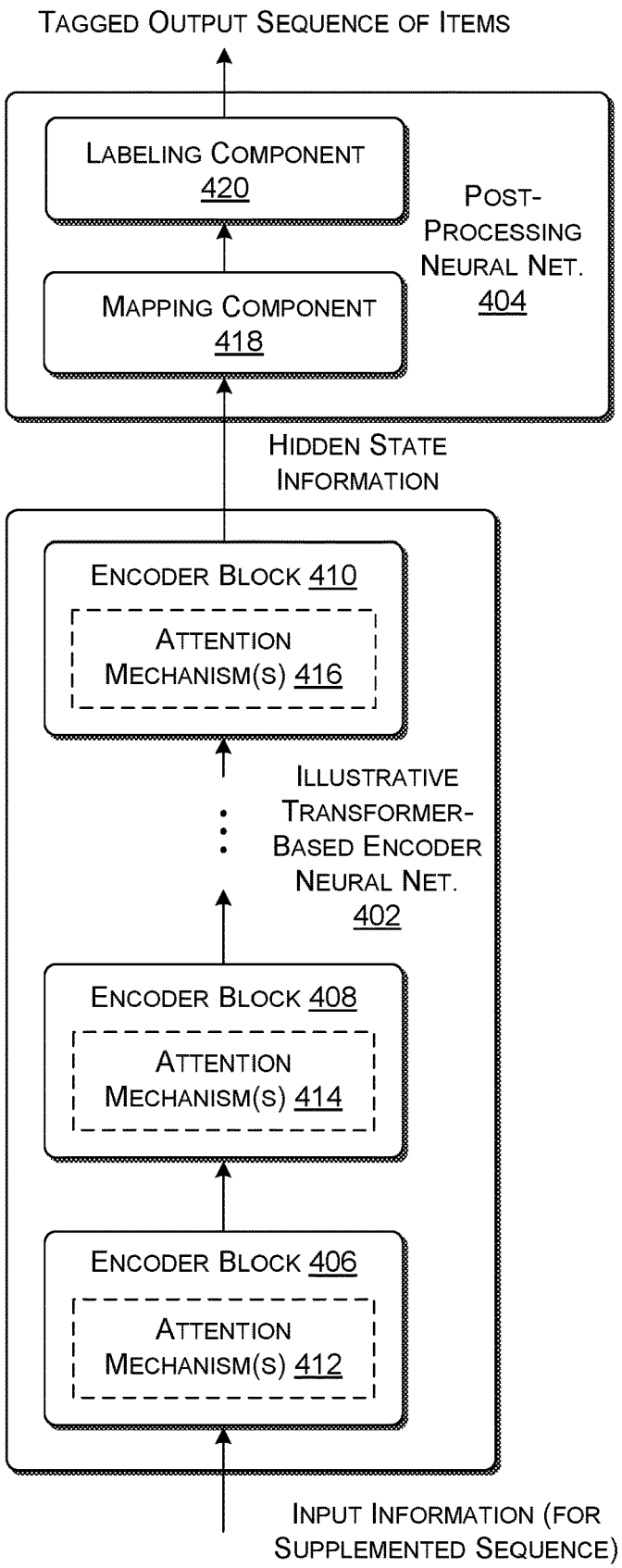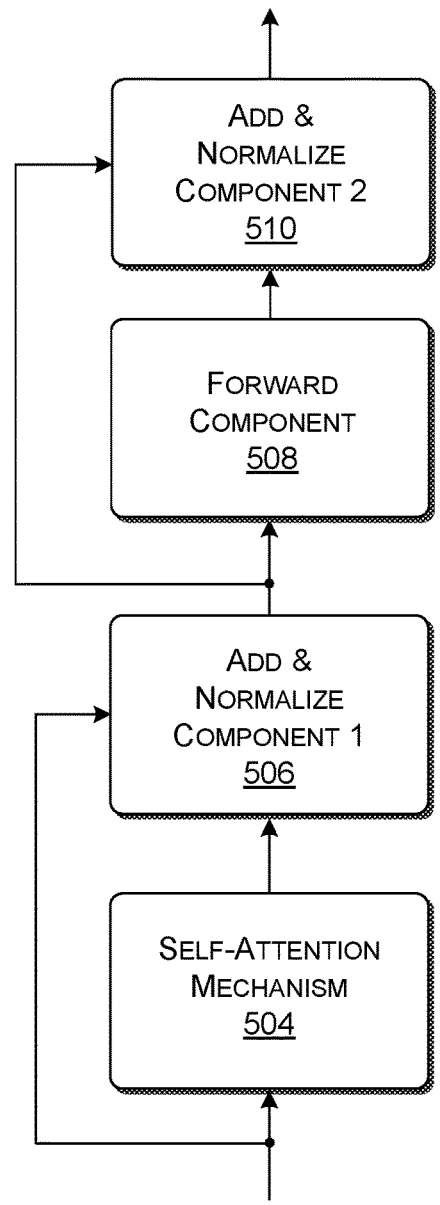
FIG. 4
FIG. 5

OVERVIEW OF OPERATION OF THE SYSTEMS OF FIG. 1, 802

OBTAIN AN ORIGINAL SEQUENCE OF ITEMS FROM A QUERY SUBMITTED BY A USER VIA A USER COMPUTING DEVICE.
804

OBTAIN SUPPLEMENTAL INFORMATION PERTAINING TO THE ORIGINAL SEQUENCE OF ITEMS FROM AT LEAST ONE SOURCE OF SUPPLEMENTAL INFORMATION, THE AT LEAST ONE SOURCE INCLUDING MATCHING LOGIC THAT MAPS THE ORIGINAL SEQUENCE OF ITEMS TO THE SUPPLEMENTAL INFORMATION.
806

APPEND THE SUPPLEMENTAL INFORMATION TO THE ORIGINAL SEQUENCE OF ITEMS, WITH A SEPARATOR TOKEN THEREBETWEEN, TO PRODUCE A SUPPLEMENTED SEQUENCE OF ITEMS.
808

MAP THE SUPPLEMENTED SEQUENCE OF ITEMS INTO HIDDEN STATE INFORMATION USING A TRANSFORMER-BASED ENCODER NEURAL NETWORK.
810

PROCESS THE HIDDEN STATE INFORMATION WITH A POST-PROCESSING NEURAL NETWORK, TO PRODUCE A TAGGED OUTPUT SEQUENCE OF ITEMS, EACH PARTICULAR ITEM IN THE TAGGED OUTPUT SEQUENCE OF ITEMS HAVING A TAG THAT IDENTIFIES A CLASS OF ENTITY TO WHICH THE PARTICULAR ITEM PERTAIN.
812

IDENTIFY, USING A SEARCH SYSTEM, A TARGET ITEM THAT MATCHES THE TAGGED OUTPUT SEQUENCE.
814

PROVIDE INFORMATION TO THE USER REGARDING THE TARGET ITEM, THE TRANSFORMER-BASED ENCODER NEURAL NETWORK AND THE POST-PROCESSING NEURAL NETWORK HAVING BEEN TRAINED IN A PRIOR TRAINING PROCESS BASED ON A CORPUS OF TRAINING EXAMPLES, THE TRAINING EXAMPLES INCLUDING ORIGINAL SEQUENCES OF ITEMS THAT ARE GIVEN ENTITY-SPECIFIC LABELS AND INSTANCES OF SUPPLEMENTAL INFORMATION THAT LACK ENTITY-SPECIFIC LABELS.
816

FIG. 8

OVERVIEW OF OPERATION OF THE TRAINING SYSTEM, 902

MULTI-TASK SEQUENCE TAGGING WITH INJECTION OF SUPPLEMENTAL INFORMATION

BACKGROUND

A sequence tagger assigns tags to respective items in a sequence of items. For example, a sequence tagger can apply tags to a sequence of words. A tag assigned to a particular word may describe an entity class or other characteristic associated with the word. For instance, the tag may specify that the word describes part of a brand name. More generally, the tags applied by the sequence tagger are drawn from an application-specific vocabulary of tags. Different applications may use different vocabularies of tags.

Various tools have been proposed to implement sequence taggers, including dictionary lookup mechanisms, statistical models (such as Hidden Markov Model (HMM) models, Conditional Random Fields (CFR) models, etc.), machine-trained classification models, etc. While useful, these tools may present various technical challenges. For example, the process of developing a sequence tagger may be labor-intensive in nature, and may require a commensurately large amount of computing resources. Once developed, the machine-trained model may exhibit substandard performance for some sequences of items.

SUMMARY

A tagging system appends supplemental information to an original sequence of items, to produce a supplemented sequence of items. The tagging system includes a transformer-based encoder neural network ("encoder neural network") that maps the supplemented sequence into hidden state information. The tagging system includes a post-processing neural network that transforms the hidden state information into a tagged output sequence of items. Each item in the tagged output sequence includes a tag that identifies its entity class. The tagging system can increase the accuracy of its generated tags based on the inclusion of the supplemental information. This is because the supplemental information adds context to the original sequence, which enables the tagging system to more effectively interpret the items in the original sequence.

According to some illustrative aspects, the tagging system extracts the supplemental information from search results generated by a search system. The search system generates the search results based on the submission of a query that matches the original sequence. The tagging system can be said to indirectly benefit from whatever matching logic that the search system uses to match the query to the supplemental information, without incorporating that matching logic into its own architecture. This provision simplifies the tagging system.

According to some illustrative aspects, a training system generates training examples in which ground-truth labels are applied to the items in the original sequence, but not the items in the supplemental information. That is, the training system applies the same default label of "other" to each item in the supplemental information. This labeling provision allows a developer to more quickly produce the training set (e.g., because the developer is not required to enlist a team to manually apply labels to the supplemental items). This provision also eliminates the computing resources that the developer would otherwise expend in such a manual labeling effort. The omission of entity-specific labels applied to the supplemental items also simplifies the training of the classification model.

According to some illustrative aspects, the training system may train the tagging system by adjusting weights of the encoder neural network and the post-processing neural network using a monolingual corpus of training examples. Nevertheless, the tagging system can be applied in zero-shot fashion to original sequences of items expressed in different natural languages, e.g., not limited to the particular natural language that was used by the training system. This capability of the tagging system stems, in part, from the fact that the encoder neural network is initialized using the weights of a pre-trained model. The pre-trained model, in turn, is produced using a multilingual corpus of training examples.

According to some illustrative aspects, the training system trains the tagging system to perform plural tasks using plural task-specific training sets and plural respective post-processing neural networks. This multi-task provision promotes transfer of knowledge across different tasks, which, in turn, increases the tagging accuracy of the resultant tagging system. Multi-task learning also promotes generalization in the tagging system by transferring knowledge from one task's domain to the other.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows one illustrative implementation of parts of the tagging system of FIGS. 1 and 3.

FIG. 5 shows one illustrative implementation of an encoder block that is used in the tagging system of FIG. 4.

FIG. 8 is a flowchart that describes one manner of operation of the tagging system of FIGS. 1 and 3.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a tagging system for applying tags to an original sequence of items. Section B sets forth illustrative methods that explain the operation of the tagging system of Section A. And Section C describes illustrative computing functionality that can be used to implement any aspect of the features described in Sections A and B.

A. Illustrative Computing Systems

Figure 1:
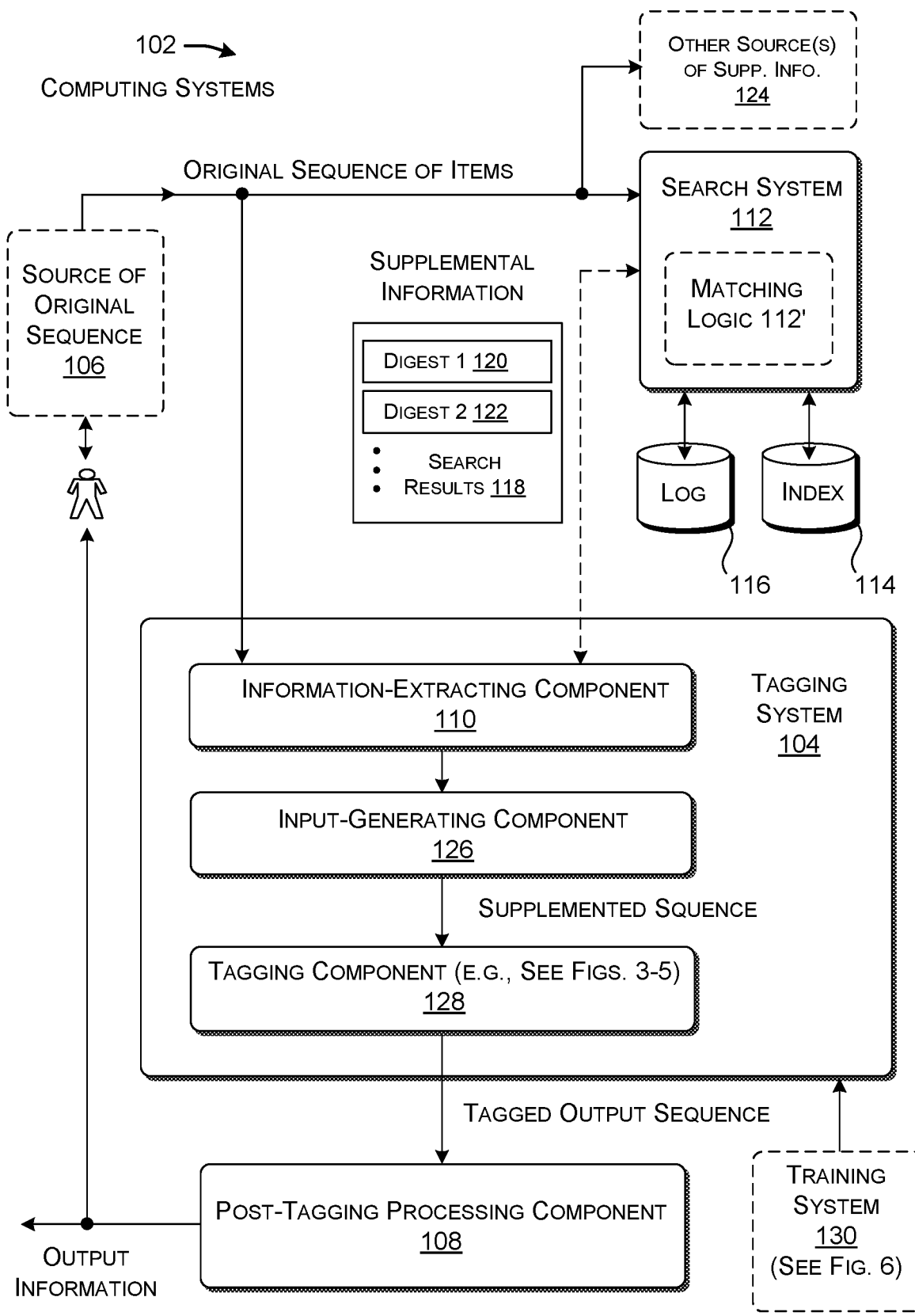
FIG. 1 shows illustrative computing systems, including a tagging system that applies tags to an original sequence of items.

FIG. 1 shows illustrative computing systems 102 in which a tagging system 104 applies tags to an original sequence of items (referred to below as an "original sequence" for brevity). The original sequence may represent a sequence of words and/or other textual units obtained from any source 106. For example, the original sequence may correspond to a query submitted by an end user via a user computing device. In another case, the original sequence may correspond to text that appears in a digital advertisement provided by an advertiser. In these examples, the original sequence is composed of text items, but the principles set forth herein are not limited to text-based tokens. In other implementations, for instance, the original sequence corresponds to a series of measurements taken at respective instances of time, a stream of spoken words, a series of image frames, and so on.

The tagging system 104 operates by assigning a tag to each item in the original sequence, to produce a tagged output sequence of items. In some contexts, a tag applied to a particular item describes an entity class that is most likely associated with the particular item. For example, given the original sequence of items, "Amy's Chocolates Spokane," the tagging system 104 may apply a tag to the word "Amy's" to indicate that it is the first part of a brand name. The tagging system 104 may apply a tag to the word "Chocolates" to indicate that it is an intermediary part of the same brand name. The tagging system 104 may apply a tag to the name "Spokane" to indicate that it most likely refers to a location. More generally, each tag that is applied to a word is drawn from an application-specific vocabulary of tags.

By way of overview, the tagging system 104 operates by retrieving supplemental information regarding the original sequence from one or more sources. The supplemental information conveys contextual information regarding the original sequence. The tagging system 104 concatenates the original sequence with the supplemental information, to produce a supplemented sequence of items ("supplemented sequence" for brevity). The tagging system 104 then uses one or more machine-trained models to map the supplemented sequence to the tagged output sequence of items ("tagged output sequence" for brevity).

A post-tagging processing component 108 performs any application-specific action(s) based on the tagged output sequence. For example, the post-tagging processing component 108 may represent matching logic that is part of a search system (described below). Assume, in that context, that the original sequence is a query submitted by a user to the search system, e.g., via a browser application of a user computing device. The post-tagging processing component 108 can use the tagged output sequence to identify at least one target item that matches the user's query, such as a document, a web page, a digital advertisement, etc. The tags in the tagged output sequence increase the amount of information that can be used to interpret the query, which, in turn, allows the post-tagging processing component 108 to more accurately match the query to candidate target items.

In other contexts, the post-tagging processing component 108 may represent part of a conversational BOT, which may be regarded as a type of search system. Assume, in that context, that the original sequence is a user utterance received by the BOT, and subsequently converted into textual tokens using a speech-to-text interface. The user utterance represents a particular type of query. The post-tagging processing component 108 can use the tagged output sequence to help interpret the user's statement. The post-tagging processing component 108 can then deliver a response to the user's utterance, e.g., by mapping the tagged output sequence to an appropriate response.

In other contexts, again assume that the post-tagging processing component 108 is part of a search system. Further assume that the original sequence of items is information presented in a target item under consideration, such as a document, a web page, a digital advertisement, etc. For example, the original sequence of items may correspond to information in a product page that describes a particular product for sale. In that context, the post-tagging processing component 108 can use the tagged output sequence to interpret the web page. The post-tagging processing component 108 can leverage this information in various ways, e.g., by creating a more descriptive entry for the web page in a search index (compared to the base case in which tagging is not performed). A more robust search index, in turn, allows the post-tagging processing component 108 to more accurately match queries to appropriate target items (again, compared to the base case in which tagging is not performed). Yet further accuracy can be gained in those implementations in which both the user's query and each candidate target item has been tagged using the process described herein. In another case, the post-tagging processing component 108 can use the post-tagging processing component 108 to create a topic node in a knowledge base for the subject matter conveyed by the web page.

In other cases, assume that the post-tagging processing component 108 is part of an advertising system. Further assume that the original sequence is information submitted by an advertiser to the advertising system in the course of creating an ad campaign. For example, assume that the original sequence corresponds to a series of key words chosen by the advertiser for a particular advertisement. The post-tagging processing component 108 can use the tagged output sequence to interpret the key words. The post-tagging processing component 108 can also leverage the tagged output sequence to offer suggestions to the user on how to improve their selected set of key words.

The above-described applications are set forth here in the spirit of illustration, not limitation.

An information-extracting component 110 can obtain supplemental information for use with an original sequence in various ways. In some implementations, the information-extracting component 110 requests a search system 112 to provide the supplemental information for the original sequence. In response, the search system 112 uses matching logic 112' to perform an on-demand search of its search index 114, treating the original sequence as a search query. At the conclusion of the search, the search system 112 can return search results that identify the target items (e.g., web pages, documents, etc.) that the search system 112 determines match the search query. Alternatively, or in addition, the matching logic 112' can consult a search log 116 to determine whether any previously-submitted query matches the original sequence. If such a prior query exists, the matching logic 112' can retrieve the previously-generated search results that the search system 112 has previously generated for the query. Without limitation, one search system that can be adapted to perform the above functions is the BING search engine provided by MICROSOFT CORPORATION of Redmond, Washington.

More specifically, the matching logic 112' can include any type(s) of algorithms, machine-trained models, etc. for matching a query against a candidate target item. For example, the matching logic 112' can extract a set of features for the query, and then consult the search index 114 to find one or more candidate target items that most closely match the query's set of features. Alternatively, or in addition, the matching logic 112' can use a machine-trained model to map the query into a distributed query vector. The matching logic 112' can then consult the search index 114 to find one or more target items having distributed target item vectors that most closely match the distributed query vector. To function as described, the search index 114 stores pre-generated features and/or distributed vectors associated with respective target items.

In whatever manner generated, the search results 118 produced by the search system 112 include a plurality of document digests (120, 122, . . . ). The digests (120, 122, . . . ) present snippets of text that summarize the target items that match the original sequence. For example, an illustrative digest of a matching target item can identify: the Uniform Resource Locator (URL) of the matching target item; the title of the matching target item; and/or an excerpt obtained from the body of the matching target item. In other words, the search results 118 may take the form of a search results page typically delivered by the search system 112 to a user's browser application.

In addition, or alternatively, the information-extracting component 110 can extract other supplemental information from other source(s) 124 besides the search system 112. For example, the other source(s) 124 can include an online knowledge base that describes semantic relations between topics, e.g., in the form of a semantic graph. The information-extracting component 110 can request the knowledge base to return any information that it identifies as having a relation to the original sequence.

An input-generating component 126 constructs the supplemented sequence based on the original sequence and the identified supplemental information. The input-generating component 126 performs this task by first selecting a group of supplemental items from the retrieved supplemental information. For example, assume that the search results 118 include digests that summarize ten documents that most closely match the original sequence, as determined by the search system 112. The input-generating component 126 can extract a predetermined number of samples from these digest. Each such sample is referred to herein as a "supplemental item." For example, the input-generating component 126 can extract portions of URL addresses that appear in the search results 118, portions of document titles that appear in the search results 118, portions of document summaries that appear in the search results 118, and so on. The input-generating component 126 can concatenate the supplemental items together into a sequence, and then append the concatenated supplemental items to the original sequence. This yields the supplemental sequence.

A tagging component 128 maps the supplemental sequence into the tagged output sequence. As will be described below in detail below in connection with the explanation of FIGS. 4 and 5, some implementations of the tagging component 128 perform the mapping function using a transformer-based encoder neural network in combination with a post-processing neural network. Additional details regarding the training process are set forth below in connection with the explanation of FIGS. 6 and 7.

Figure 2:
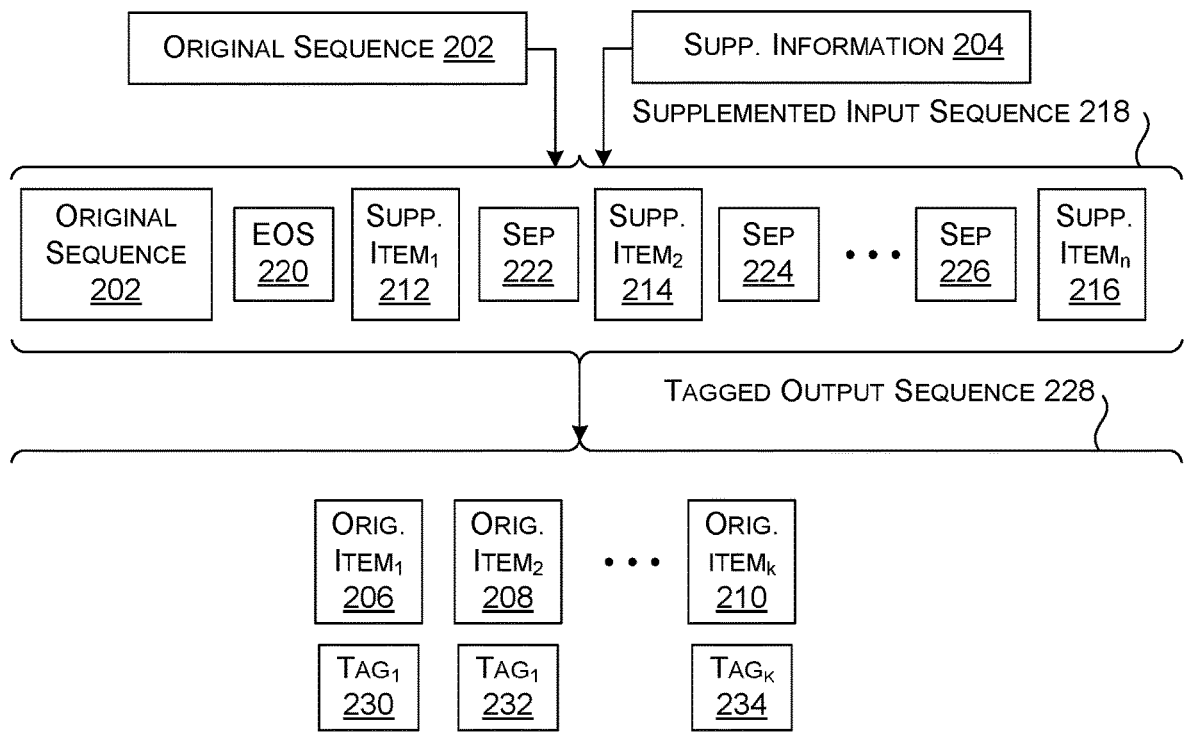
FIG. 2 shows one technique for combining an original sequence of items with supplemental information, to produce a supplemented sequence of items.

FIG. 2 provides an example of how the input-generating component 126 (of the tagging system 104) combines an original sequence 202 with supplemental information 204. In this example, the original sequence 202 includes plural original items (206, 208, . . . , 210). Likewise, the supplemental information 204 includes plural supplemental items (212, 214, . . . , 216). The input-generating component 126 produces a supplemented sequence 218 by concatenating the original sequence 202 with the supplemental information 204. It adds a marker token 220 between the original sequence 202 and the supplemental information 204. It further adds separator tokens (222, 224, . . . 226) between pairs of adjacent supplemental items.

The tagging component 128 maps the supplemented sequence 218 to a tagged output sequence 228. The tagged output sequence 228 includes a set of tags (230, 232, . . . , 234) assigned to respective original items (206, 208, . . . , 210) of the original sequence 202. For example, the tag 230 may identify the entity class associated with the first original item 206, the tag 232 may identify the entity class associated with the original item 208, and so on.

Consider a concrete example in which the original sequence 202 includes the sentence fragment "cobbly nob gatlinburg." This sentence fragment may correspond to a part of an existing digital advertisement, a collection of key terms specified by an advertiser, a query submitted by an end user, etc. The input-extracting component 110 can retrieve search results 118 from the search system 112 for this original sequence 202. For example, the search system 112 can generate the search results 118 by performing an on-demand search for a query "cobbly nob gatlinburg." Alternatively, or in addition, the search system 112 can obtain the search results 118 by extracting previously-generated search results from the search log 116, which were produced on one or more prior occasions in which "cobbly nob gatlinburg" was submitted as a query to the search system 112. The input-generating component 126 selects pieces of information from the search results 118 to produce the supplemental items (212, 214, . . . , 216). The input-generating component 126 then concatenates the supplemental items to produce the following non-limiting supplemented sequence 218: cobbly nob gatlinburg [EOS] Cobbly Nob Cafe [SEP] Gatlinburg, TN Cobbly Nob Cafe and . . . [SEP] Review of Cobbly Nob Resort in Gatlinburg [SEP] Smokey Mountains [SEP] Cobbly Nob, Gatlinburg Vacation Rentals: cabin rentals . . . [SEP]. The [EOS] token marks the end of the original sequence 202 and the beginning of the supplemental information 204. Each piece of text that terminates in a [SEP] token is a supplement item, corresponding to part of a digest extracted from the search results 118. The specific choice of information items in the above example, and the arrangement of the information items, are presented in the spirit of illustration, not limitation. For example, other implementations can use other types of demarcation tokens besides the [EOS] and [SEP] tokens.

Assume that the tagging component 128 assigns the tag "B-Brand" to the word "cobbly," indicating that this word is most likely the beginning of a brand name. The tagging component 128 assigns the tag "I-Brand" to the word "nob," indicating that this word is most likely an intermediate word in a brand name. The tagging component assigns the tag "B-Location" to the word "gatlinburg," indicating that this word most likely refers to a location associated with a brand name. As previously noted, the tagging component 128 selects these tags from a predetermined vocabulary of tags. Other applications may use a different vocabulary of tags. In some implementations, note that the tagging system 104 does not generate tags for the supplemental items (212, 214, . . . , 216) that compose the supplemental information 204.

Figure 3:
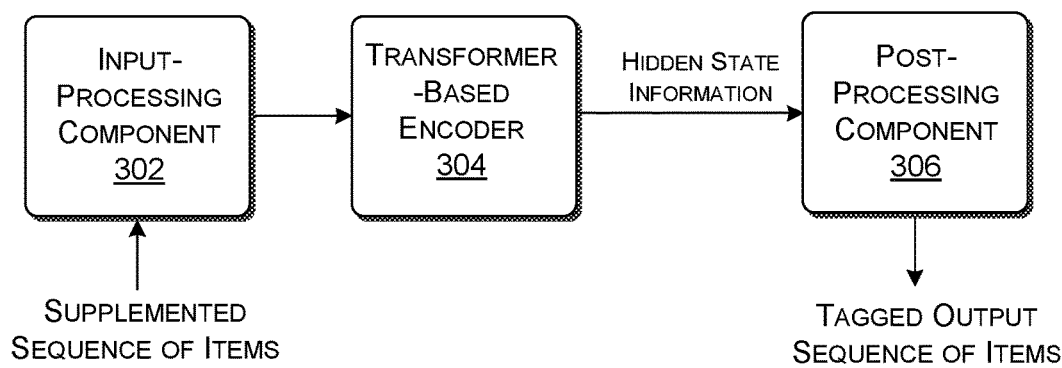
FIG. 3 shows an overview of the tagging system of FIG. 1.

FIG. 3 shows an overview of the tagging system 104 of FIG. 1. The tagging system 104 includes an input-processing component 302 for converting the supplemented sequence into input information for further processing. A transformer-based encoder 304 maps the input information into hidden state information. Finally, a post-processing component 306 maps the hidden state information into a tagged output sequence.

More specifically, the input-processing component 302 can perform various preliminary operations on the supplemented sequence. For example, the input-processing component 302 can optionally partition the words in the supplemented sequence into word fragments. For example, the input-processing component 302 can break each word into n-character fragments by moving an n-character window across the word, e.g., by breaking "Gatlinburg" into the three-character fragments "#Ga," "Gat," "atl," "tli," "lin," "inb, "nbu," "bur," "urg," and "rg #". Alternatively, or in addition, the input-processing component 302 can use a lookup dictionary to break each word into one or more word fragments. One non-limiting technique for generating a lookup table is the WordPiece model described in W U, et al., "Google's Neural Machine Translation System: Bridging the Gap between Human and Machine Translation," arXiv e-prints, arXiv:1609.08144v2 [cs.CL], Oct. 8, 2016, 23 pages. The input-processing component 302 may convert each word (or word fragment) that it identifies into a vector representation, referred to herein as an embedding vector. This transformation can be performed using a pre-generated lookup table, a machine-trained embedding model, etc. The input-processing component 302 can also combine each embedding vector with position information that describes the position of the word (or word fragment) in the supplemented sequence 218. For example, the input-processing component 302 can append position information to the embedding vector for the word "gatlinburg" to indicate that this word is the third word in the supplemented sequence 218. This operation yields position-modified embedding vectors.

In some cases, the input processing component 302 further masks one or more of the word fragments. Masking a word fragment prevents the remainder of the tagging component 128 from generating a tag for the word fragment. For example, assume that the WordPiece tokenization algorithm breaks the original word "rib" into the word fragments "rib" and "s". The input processing component 302 can mask the "s" word fragment. This will prevent the remaining functionality of the tagging component 128 from assigning a separate score to the "s" fragment. The tagging component 128 can rely on the tag assigned to the word fragment "rib" to designate the tag to be assigned to the original word "ribs." In some implementations, the input processing component 302 consults a lookup table and/or rules to determine which word fragment should be masked.

The transformer-based encoder 304 can use one or more encoder blocks to map the input information provided by the input-processing component 302 into the hidden state information. Background information on the standalone topic of the transformer architecture is provided in the seminal paper by VASWANI, et al., "Attention Is All You Need," in 31st Conference on Neural Information Processing Systems (NIPS 2017), 2017, 11 pages. However, the use of the transformer architecture is merely representative; the principles set forth herein can be implemented using other types of machine-trained models, such as convolutional neural networks (CNNs), recurrent neural networks (RNNs), etc. Additional information regarding the operation of the transformer-based encoder 304 is set forth below in the context of the explanation of FIGS. 4 and 5.

In some implementations, the transformer-based encoder 304 generates hidden state information for each word (or word fragment) of the supplemented sequence 218. The post-processing component 306 can use the hidden state information associated with a particular word (or word fragment) to compute the probability that the word represents each possible tag in a vocabulary of tags. Using an argmax operation, the post-processing component 306 can then identify the tag that has the highest probability. The post-processing component 306 assigns the tag having the highest probability to the particular word under consideration.

FIG. 4 shows a transformer-based encoder neural network ("encoder neural network") 402 and a post-processing neural network 404. The encoder neural network 402 represents one non-limiting implementation of the transformer-based encoder 304 of FIG. 3. The post-processing neural network 404 represents one non-limiting implementation of the post-processing component 306 of FIG. 3.

Referring first to the encoder neural network 402, this component receives input information supplied by the input-processing component 302, expressed as a series of position-modified embedding vectors. The encoder neural network 402 maps the input information into hidden state information using a pipeline of encoder blocks (406, 408, . . . , 410), with each encoder block receiving its input information from a preceding encoder block (if any). The encoder blocks (406, 408, . . . , 410) include respective attention mechanisms (412, 414, . . . , 416) (described below).

The post-processing neural network 404 can include a mapping component 418 that maps the hidden state information into output information. For example, the mapping component 418 may be implemented as a feed-forward neural network having any number of layers. In some implementations, the feed-forward neural network performs a linear transformation. A labeling component 420 uses the output information to determine a tag for each word (or word fragment) in the original sequence. For example, the labeling component 420 can be implemented as a softmax function (i.e., a normalized exponential function) that generates a probability score for each tag in a tag vocabulary, and then selects the tag having the highest score. In other implementations, the labeling component 420 corresponds to a machine-trained classification model, such as a support vector machine (SVM) model.

FIG. 5 shows an illustrative and non-limiting encoder block 502. It includes a self-attention mechanism 504, an add-&-normalize component 506, a feed-forward component 508, and another add-&-normalize component 510. The self-attention mechanism 504 performs self-attention. The first add-&-normalize component 506 adds the input information fed to the self-attention mechanism 504 to the output information provided by the self-attention mechanism 504 (thus forming a residual connection), and then performs layer-normalization on that result. Layer normalization entails adjusting values in a layer based on the mean and deviation of those values in the layer. The second add-&- normalize component 510 performs the same function as the first add-&-normalize component 506.

In some implementation, each attention mechanism in the self-attention mechanism 504 generates attention information using the following equation:

$$attn(Q, K, V) = \text{softmax}\left(\frac{QK^T}{\sqrt{d}}\right)V. \quad (1)$$

Query information Q is produced by multiplying the input vectors associated with input information fed to the attention mechanism 504 by a query weighting matrix $W^Q$. Key information K and value information V are produced by multiplying the same input vectors by a key weighting matrix $W^K$ and a value weighting matrix $W^V$, respectively. Equation (1) involves taking the dot product of Q by the transpose of K, and then dividing that dot product by a scaling factor $\sqrt{d}$, where d may represent the dimensionality of the machine-learned model. This yields a scaled result. Equation (1) then involves computing the softmax of the scaled result, and then multiplying the result of the softmax operation by V. From a more general perspective, the self-attention mechanism 504 uses Equation (1) to determine the amount of focus (attention) that should be placed on each part of the input information, when processing a particular part of the input information under consideration.

Figure 6:
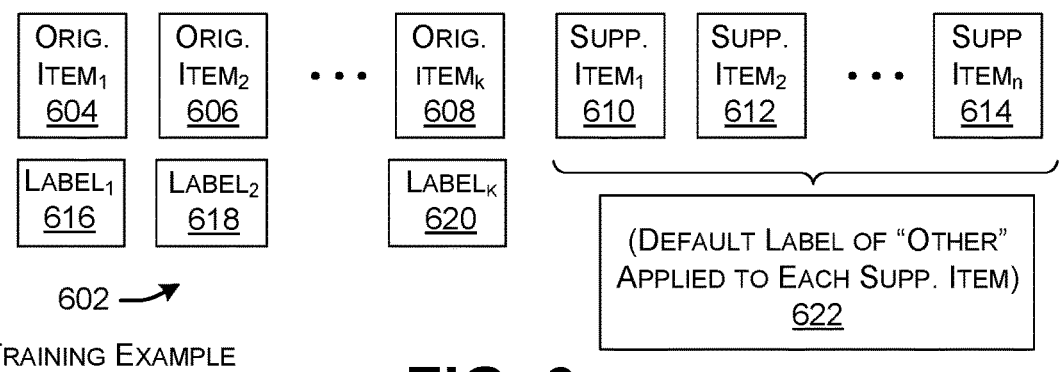
FIG. 6 shows an illustrative training example that can be used to train the tagging system of FIG. 1.

FIG. 6 shows an illustrative training example 602 that can be used to train the tagging system 104 of FIG. 1. The training example 602 includes an original sequence that includes one or more original items (e.g., original items 604, 606, . . . , 608). The training example 602 includes supplemental information that includes one or more supplemental items (e.g., supplemental items 610, 612, . . . , 614). The training example 602 assigns a label to each original item, e.g., by specifying labels (616, 618, . . . , 620) for the respective original items (604, 606, . . . , 608). For example, assume that that the training example includes the previously-described phrase "cobbly nob gatlinburg." The training example 602 may specify the label "B-Brand" for "cobbly," "I-Brand" for "nob," and "B-Location" for "gatlinburg." In contrast, the training example 602 can associate the label "other" 622 to each supplemental item in the supplemental information. That is, no attempt is made to select an entity-specific tag for each supplemental item in the supplemental information.

In some implementations, a developer uses one or more human analysts to create the labels (616, . . . , 622) specified above. The developer can produce training examples in a reduced amount of time (and using a reduced amount of computing resources) by assigning the default label "other" 622 to each of the supplemental items in the training examples. Further, the use of the "other" label reduces the complexity of the training operation described below. It also reduces the training operation's consumption of resources. This is because the training system 130 is freed from the responsibility of computing loss information for the supplemental items.

Figure 7:
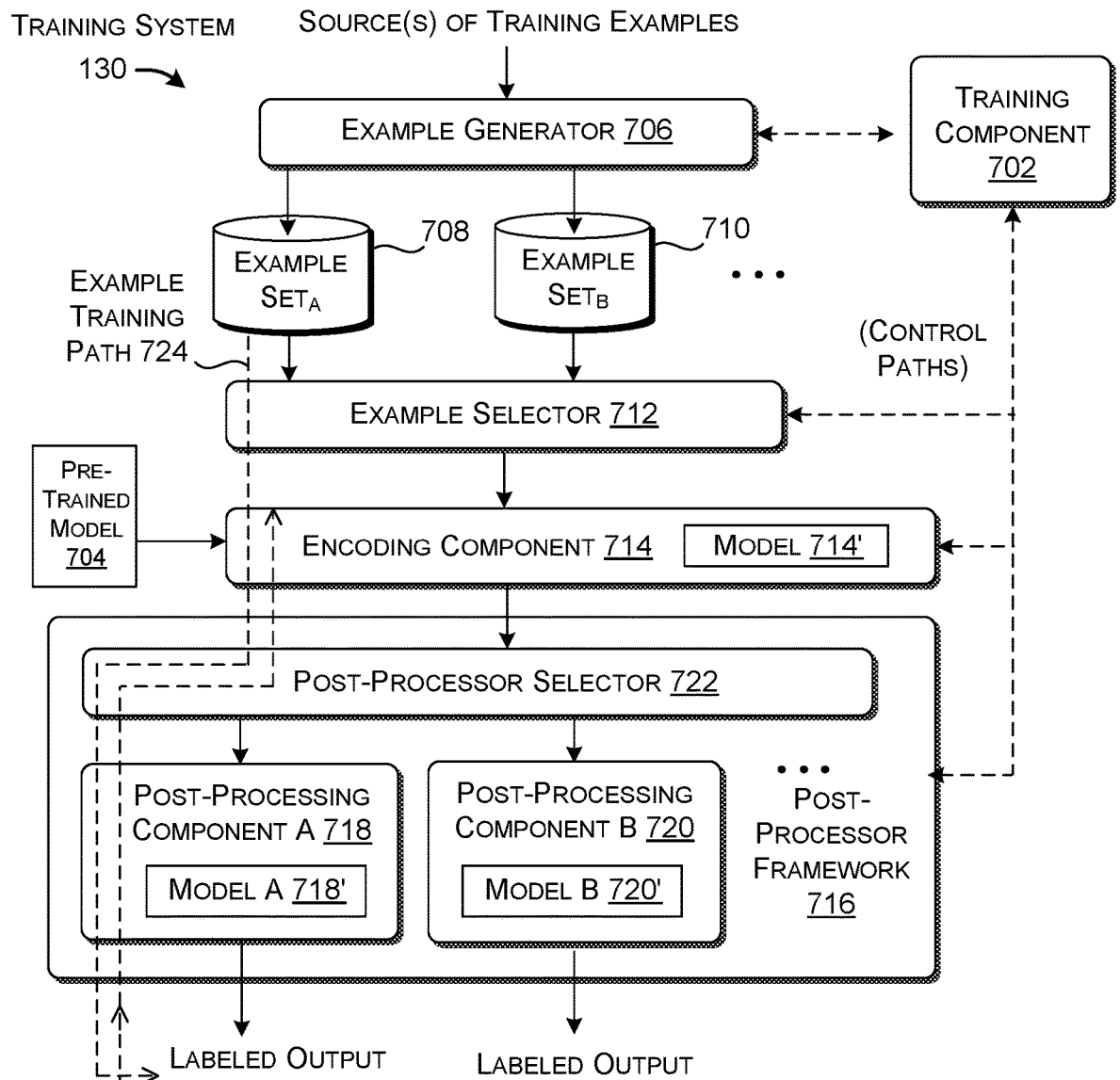
FIG. 7 shows one illustrative implementation of a training system that can be used to train the tagging system of FIG. 1.

FIG. 7 shows one illustrative implementation of the training system 130, which is controlled by a training component 702. The goal of the training system 130 is to train an encoder machine-trained model that controls the operation of the transformer-based encoder 304 (of FIG. 3), and to train a post-processing machine-trained model that controls the operation of the post-processing component 306 (of FIG. 3). A model is a set of weights iteratively produced by the training system 130.

From a high-level perspective, the training system 130 uses a multi-task framework to train the machine-trained models. The training system 130 specifically trains its machine-trained models to perform plural labeling tasks. Each labeling task is performed using a task-specific set of training examples. Each labeling task is also performed using a task-specific post-processing component.

Further, the training process initializes the encoder machine-trained model at the start of the training process using a pre-trained machine-trained model 704. In some implementations, a preliminary training process (not shown) produces the pre-trained model 704 based on a multilingual set of training examples. The preliminary training process can specifically train the model 704 to perform one or more tasks. In one such task, the preliminary training process can randomly mask words in the training examples. The preliminary training process can then train the model 704 to predict the identity of the masked words. In contrast, the training performed by the training system 130 itself (which follows the pre-training) uses examples generated for a single natural language, such as English.

Now referring to the particulars of FIG. 7, an example-generator 706 produces plural training sets associated with plural labeling tasks. For example, assume that the goal of the tagging system 104 is to apply descriptive tags to different kinds of digital advertisements. Assume, for example, that a first kind of digital advertisement may include one or more images of a product or service being advertised, accompanied by a relatively brief textual description of the product or service. A second kind of digital advertisement may include a more lengthy description of a product or service compared to the first kind of digital advertisement, without accompanying image content. Here, the example generator 706 produces a first training set for applying tags to text that appears in the first kind of digital advertisement. The example generator 706 produces a second training set for applying tags to text that appears in the second kind of digital advertisement. The example generator 706 can store the first and second sets in respective data stores (708, 710). Each training set includes a collection of training examples.

More specifically, the example generator 706 can produce the first training set by selecting original sequences from a data set in a data store (not shown) that provides instances of the first type of digital advertisements. The example generator 706 can then produce supplemented sequences using the process described above in connection with FIG. 1. The example generator 706 can produce the second training set in the same manner from another data set. Note that the above-described example of a multi-task learning environment is presented in the spirit of illustration, not limitation. Other implementations of the training system 130 perform multi-task learning by invoking other combinations of tasks (not limited to labeling tasks).

An example selector 712 randomly chooses a training example from one of the training sets. For instance, on a first occasion, the example selector 712 can select a training example (or batch of training examples) from a first set of training examples. On a second occasion, the example selector 712 can select a training example (or a batch of training examples) from a second set of training examples.

Assume that the example selector 712 selects a training example from the first set of training examples stored in the data store 708. An encoding component 714 produces hidden state information based on the supplemented sequence associated with the selected training example. Note that the encoding component 714 represents the union of the functions performed by the input-processing component 302 and the transformer-based encoder 304 of FIG. 3. The encoding component 714 includes an encoding model 714'.

A post-processor framework 716 includes a set of task-specific post-processing components (718, 720, . . . ), having respective machine-trained models (718', 720', . . . ). A post-processor selector 722 selects one of the task-specific post-processing components (718, 720, . . . ) based on the kind of training example that is being processed at any given time. For example, assume that the training example originates from the first set of training examples provided in the data store 708; for this case, the post-processor selector 722 can select a first post-processing component 718 to process the training example. The first post-processing component 718 maps the hidden state information generated by the encoding component 714 to labeled output information for the training example under consideration. FIG. 7 illustrates the above-described pipeline of operations that are performed on the training example that originates from the data store 708 as a training path 724.

The training component 702 can compute loss information for the above-described training example by comparing the ground-truth labels associated with the training example with the tags produced by the first post-processing component 718. The training component 702 can compute gradients based on this loss information and then back-propagate the gradients through the path 724. This back-propagation operation involves adjusting the weights of the model 718' of the post-processing component 718 and the weights of the model '714 of the encoding component 714. The goal of this updating operation is to reduce future differences between the ground-truth labels and the predicted labels.

More specifically, the process of adjusting the weights of the model 714' includes a process of fine-tuning the weights of the pre-trained model 704. Note that the training component 702 updates the weights for the model 714' regardless of what kind of training example is being processed at any given time. But the training component 702 selectively updates weights for only the task-specific post-processing model that is invoked for the training example under consideration. That is, because the training example described above is pulled from the first data store 708, the training component 702 updates the weights of the first model 718', but not the weights of the second model 720'. When processing a training example pulled from the second data store 710, the training component 702 will update the weights for the second model 720', but not the first model 718'.

The training component 702 can repeat the above training process until a predetermined training objective is achieved. In this process, the training component 702 need not generate tags for any supplemental item associated with a training example. The training component 702 also need not compute loss information and gradients for any supplemental item. This provision helps simplify the training process, and reduce its consumption of resources.

The above-described tagging system 104 and the training system 130 have various technical merits. First, the tagging system 104 can increase the accuracy of its tag assignments for an original sequence under consideration using the supplemental information. That is, the supplemental information provides additional context pertaining to the original sequence under consideration. The tagging system 104 can leverage the additional context to help interpret the items in the original sequence. This advantage may be particularly pronounced for the case in which the original sequence includes only a few words. Without the benefit of context, there is a significance risk that the tagging system 104 will produce inaccurate tags for this kind of original sequence.

It may also be said that the tagging system 104 can indirectly benefit from whatever matching logic 112' the search system 112 uses to associate the original sequence with supplemental information. As noted previously, for example, the matching logic 112' may employ its own machine-trained model and/or algorithm (not shown) to match the original sequence to a set of documents. The tagging system 104 can indirectly leverage this intelligence by extracting supplemental information from the search results produced by the search system 112, without replicating this intelligence in the tagging system 104 itself. This provision also simplifies the tagging system 104 and the effort required to develop and maintain it.

Note that the tagging system 104 may be able to provide comparatively accurate results even when, in a particular instance, the supplemental information added to the original sequence is not very robust (compared to other instances of supplemental information). This is because the machine-trained models of the tagging system 104 have learned how to interpret the original sequence based on plural training examples, many of which include robust supplemental information.

Second, the training system 130 can further increase the accuracy of its models by using the multi-task architecture shown in FIG. 7. This is because the training system 130 forces the model used by the transformer-based encoder 304 to learn plural tasks. This induces knowledge transfer among tasks, which results in the production of a more accurate and resilient model (compared to the case in which a multi-framework is not used). For example, multi-task learning promotes generalization in the model by transferring knowledge from one task's domain to the other. The use of multi-task learning can also allow the training system 130 to converge on its training objective in less time and with reduced consumption of computing resources compared to a base case that does not use multi-task learning. This is because the training system 130 gains insight through the use of multi-task learning that would take a longer time to replicate for the case of single-task learning.

Third, the tagging system 104 produced by the training system 130 is capable of processing original sequences expressed in any natural language, even though the training system 130 may have trained its models using examples expressed in only a single natural language. This capability stems, in part, from the fact that the transformer-based encoder 304 is trained by fine-tuning the pre-trained model 704, which, in turn, is produced beforehand based on a multilingual set of training examples. The training process performed by the training system 130 is efficient because it does not require a developer to spend the time and computing resources to produce and apply language-specific sets of training examples.

Fourth, as already mentioned, the training process does not demand that the developer produce training examples in which entity-specific labels are applied to supplemental items. Rather, the training process can uniformly apply the default label "other" to each supplemental item. This provision further increases the efficiency of the training process, both in terms of the time required to produce the machine-trained models, and the computing resources employed in this effort.

The above technical merits are set forth above in the spirit of illustration, not limitation. The training process and resultant tagging system 104 can confer yet other technical advantages.

B. Illustrative Processes

Figure 9:
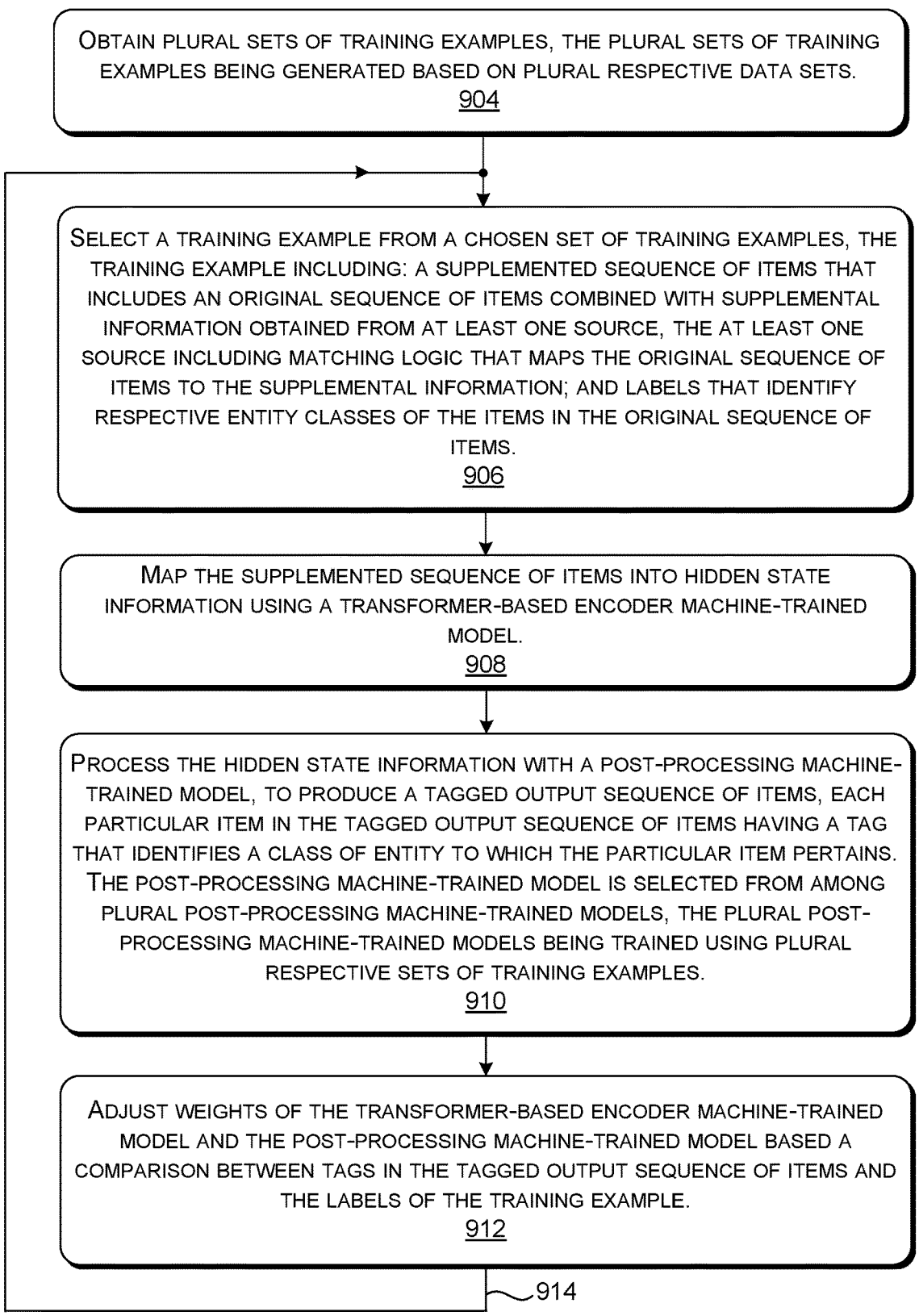
FIG. 9 is a flowchart that describes one manner of operation of the training system of FIG. 7.

FIGS. 8 and 9 show processes that explain the operation of the computing systems 102 of Section A in flowchart form. Since the principles underlying the operation of the computing systems 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 8 shows a process 802 for tagging sequences of items using the tagging system 104. In block 804, the tagging system 104 obtains an original sequence of items from a query submitted by a user via a user computing device. In block 806, the tagging system 104 obtains supplemental information pertaining to the original sequence of items from at least one source of supplemental information. The source(s) includes mapping logic 112' that maps the original sequence of items to the supplemental information. In block 808, the tagging system 104 appends the supplemental information to the original sequence of items, with a separator token therebetween, to produce a supplemented sequence of items. In block 810, the tagging system 104 maps the supplemented sequence of items into hidden state information using the transformer-based encoder neural network 402. In block 812, the tagging system 104 processes the hidden state information with the post-processing neural network 404, to produce a tagged output sequence of items. Each particular item in the tagged output sequence of items has a tag that identifies a class of entity to which the particular item pertains. In block 814, the post-processing component 108 identifies, using the search system 112, a target item that matches the tagged output sequence. In block 816, the post-tagging processing component 108 provides output information to the user regarding the target item. In some implementations, the transformer-based encoder neural network 402 and the post-processing neural network 404 are trained in a prior training process based on a corpus of training examples. The training examples include original sequences of items that are given entity-specific labels and instances of supplemental information that lack entity-specific labels.

FIG. 9 shows a process 902 by which the training system 130 trains the machine-trained models used in the training system 104. In block 904, the training system 130 obtains plural sets of training examples, the plural sets of training examples being generated based on plural respective data sets. In block 906, the training system selects a training example from a chosen set of training examples. The training example includes: a supplemented sequence of items that includes an original sequence of items combined with supplemental information obtained from at least one source, the at least one source including the matching logic 112' that maps the original sequence of items to the supplemental information; and labels that identify respective entity classes of the items in the original sequence of items. In block 908, the training system 130 maps the supplemented sequence of items into hidden state information using the transformer-based encoder machine-trained model (714'). In block 910, the training system 130 processes the hidden state information with a post-processing machine-trained model (718'), to produce a tagged output sequence of items. Each particular item in the tagged output sequence of items has a tag that identifies a class of entity to which the particular item pertains. The post-processing machine-trained model 718' is selected from among plural post-processing machine-trained models (718', 720'), the plural post-processing machine-trained models (718', 720') being trained using plural respective sets of training examples. In block 912, the training system 104 adjusts weights of the transformer-based encoder machine-trained model (714') and the post-processing machine-trained model (718') based on a comparison between tags in the tagged output sequence of items and the labels of the training example. The feedback loop 914 represents the repetition of blocks 906 to 912 one or more times until a training objective is achieved.

C. Representative Computing Functionality

Figure 10:
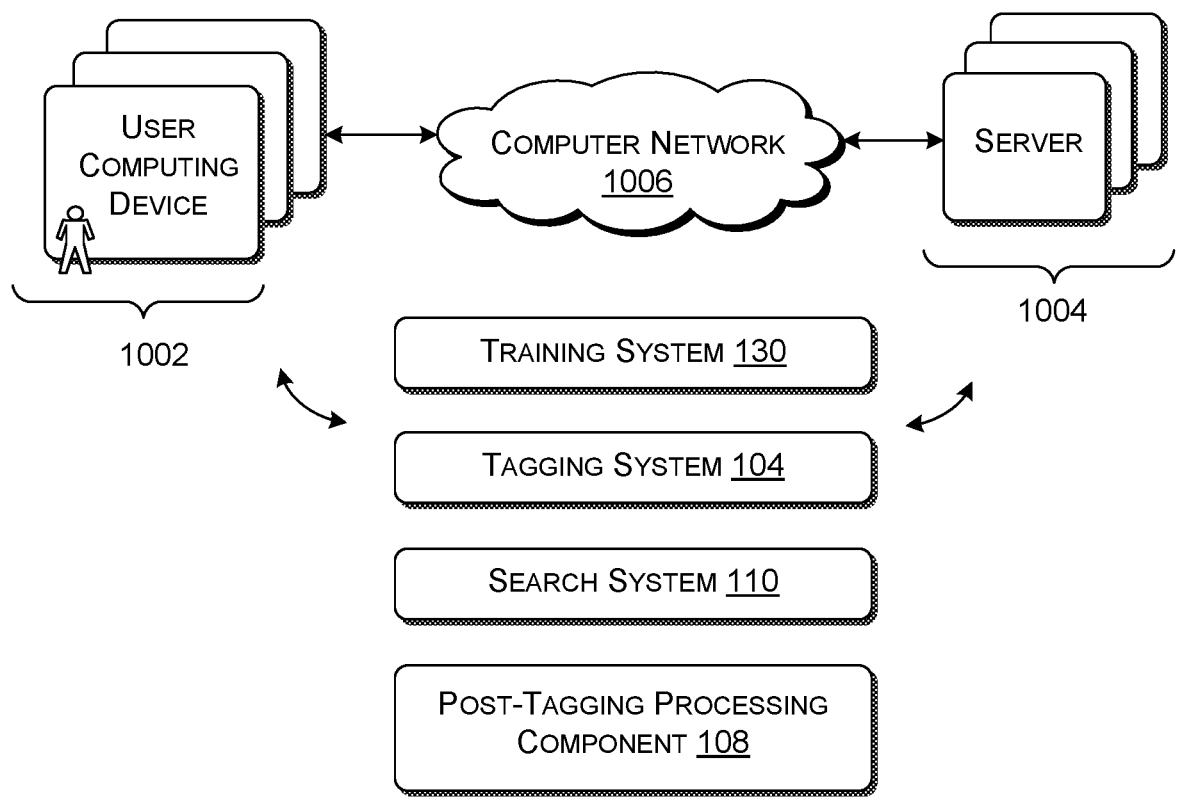
FIG. 10 shows computing equipment that can be used to implement the computing systems shown in FIG. 1

FIG. 10 shows an example of computing equipment that can be used to implement any of the systems summarized above. The computing equipment includes a set of user computing devices 1002 coupled to a set of servers 1004 via a computer network 1006. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1006 can be implemented as a local area network, a wide area network (e.g., the Internet), one or more point-to-point links, or any combination thereof.

FIG. 10 also indicates that the tagging system 104, the search system 112, the post-tagging processing system 108, and the training system 130 can be spread across the user computing devices 902 and/or the servers 1004 in any manner. For instance, in some cases, the tagging system 104 is entirely implemented by one or more of the servers 1004. Each user may interact with the servers 1004 via a user computing device. In other cases, the tagging system 104 is entirely implemented by a user computing device in local fashion, in which case no interaction with the servers 1004 is necessary. In another case, the functionality associated with the tagging system 104 is distributed between the servers 1004 and each user computing device in any manner.

Note that the search system 112 can serve at least two roles. It can interact with a user who is performing a search, e.g., by receiving a query from the user, processing the query using the matching logic 112', and then sending search results to the user. In this context, the user can interact with the search system 112 via a user computing device. The search system 112 can also use its matching logic 112' to produce supplemental information when requested by the information-extracting component 110. In other cases, the computing systems 102 of FIG. 1 rely on two different search systems (not shown) to perform the above-described two roles.

Figure 11:
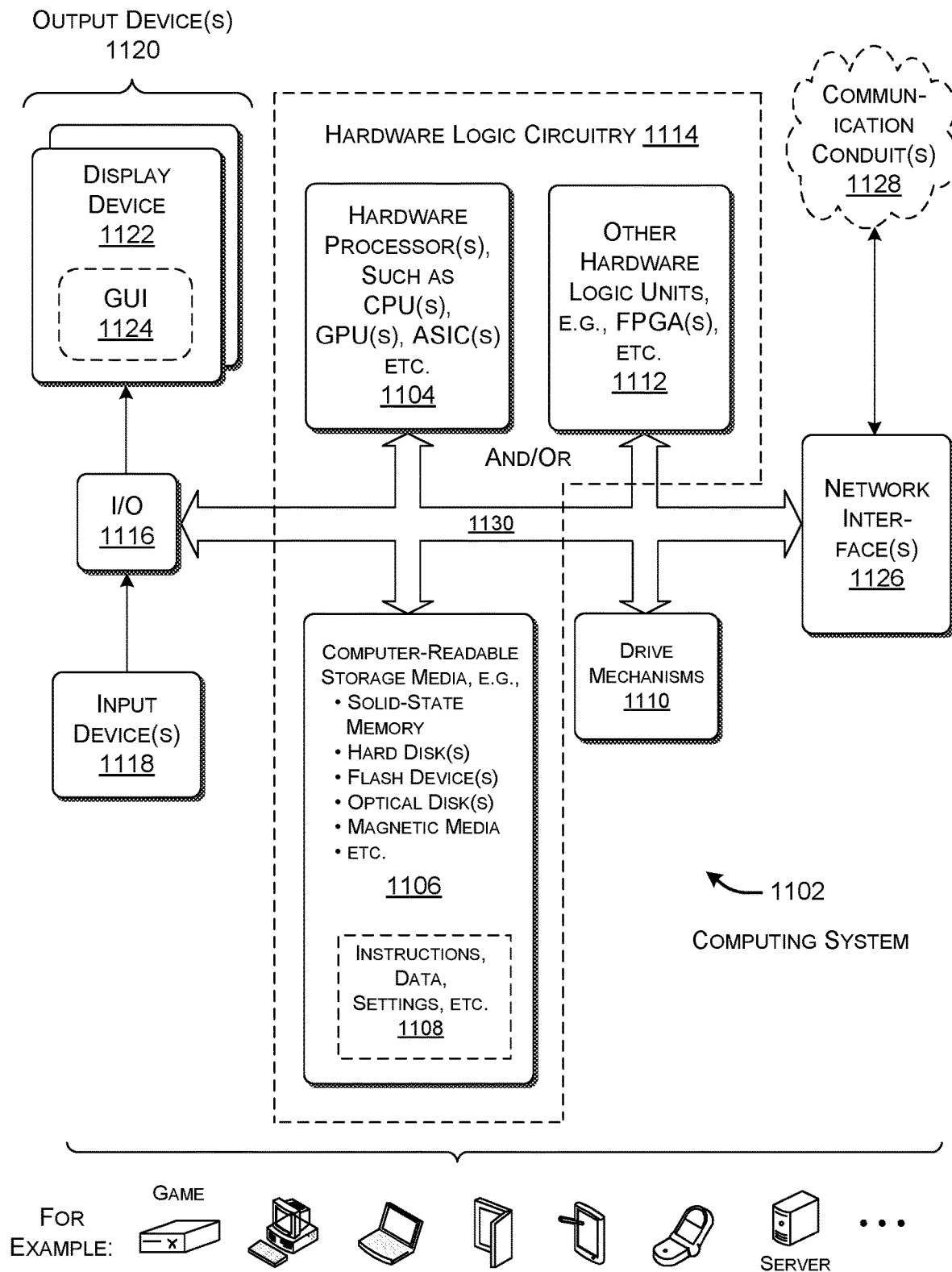
FIG. 11 shows an illustrative type of computing system that can be used to implement any aspect of the features shown in the foregoing drawings.

FIG. 11 shows a computing system 1102 that can be used to implement any aspect of the mechanisms set forth in the above-described figures. For instance, the type of computing system 1102 shown in FIG. 11 can be used to implement any user computing device or any server shown in FIG. 10. In all cases, the computing system 1102 represents a physical and tangible processing mechanism.

The computing system 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1102 can also include computer-readable storage media 1106, corresponding to one or more computer-readable media hardware units. The computer-readable storage media 1106 retains any kind of information 1108, such as machine-readable instructions, settings, data, etc. Without limitation, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing system 1102. Further, any instance of the computer-readable storage media 1106 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing system 1102, and/or a hardware storage unit (such as a hard disk) for retaining/archiving information on a more permanent basis. In the latter case, the computing system 1102 also includes one or more drive mechanisms 1110 (such as a hard drive mechanism) for storing and retrieving information from an instance of the computer-readable storage media 1106.

The computing system 1102 may perform any of the functions described above when the hardware processor(s) 1104 carry out computer-readable instructions stored in any instance of the computer-readable storage media 1106. For instance, the computing system 1102 may carry out computer-readable instructions to perform each block of the processes described in Section B.

Alternatively, or in addition, the computing system 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing system 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1114 that performs a particular function or combination of functions.

In some cases (e.g., in the case in which the computing system 1102 represents a user computing device), the computing system 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing system 1102 as being composed of a discrete collection of separate units. In some cases, the collection of units corresponds to discrete hardware units provided in a computing device chassis having any form factor. FIG. 11 shows illustrative form factors in its bottom portion. In other cases, the computing system 1102 can include a hardware logic unit that integrates the functions of two or more of the units shown in FIG. 1. For instance, the computing system 1102 can include a system on a chip (SoC or SOC), corresponding to an integrated circuit that combines the functions of two or more of the units shown in FIG. 11.

The following summary provides a non-exhaustive set of illustrative examples of the technology set forth herein.

(A1) According to a first aspect, some implementations of the technology described herein include a method (e.g., the process 802) for tagging sequences of items. The method includes: obtaining (e.g., 804) an original sequence of items from a query submitted by a user via a user computing device; obtaining (e.g., 806) supplemental information pertaining to the original sequence of items from at least one source (e.g., 112) of supplemental information, the at least one source including mapping logic (e.g., 112') that maps the original sequence of items to the supplemental information; appending (e.g., 808) the supplemental information to the original sequence of items, with a separator token therebetween, to produce a supplemented sequence of items; mapping (e.g., 810) the supplemented sequence of items into hidden state information using a transformer-based encoder neural network (e.g., 402); and processing (e.g., 812) the hidden state information with a post-processing neural network (e.g., 404), to produce a tagged output sequence of items. Each particular item in the tagged output sequence of items has a tag that identifies a class of entity to which the particular item pertains. The method further includes: identifying (e.g., 814), using a search system (e.g., 112), a target item that matches the tagged output sequence; and providing (e.g., 816) output information to the user regarding the target item. The transformer-based encoder neural network and the post-processing neural network are trained in a prior training process based on a corpus of training examples. The training examples include original sequences of items that are given entity-specific labels and instances of supplemental information that lack entity-specific labels.

According to one technical characteristic, the above-summarized method increases the accuracy of the tags it produces based the use of supplemental information. The method can also indirectly benefit from the matching logic 112' of the source(s) from which it obtains the supplemental information, without incorporating that logic in the tagging system itself. This provision reduces the complexity of the tagging operation itself (e.g., by not requiring a developer to provide custom logic for generating the supplemental information). Further, the method uses a training process in which not all of the items in a training example need to be given entity-specific labels. This provision reduces the amount of labor required by the training process, and the associated use of computing resources.

(A2) According some implementations of the method of A1, the transformer-based encoder neural network and the post-processing neural network are also trained in the prior training process to perform plural tasks.

(A3) According some implementations of any of the methods of A1 and A2, the at least one source includes the search system, and wherein the operation of obtaining supplemental information includes: obtaining search results generated by the matching logic of the search system based on the query, the search results including a set of matching-document digests that describe documents that match the query, as determined by the search system; and selecting one or more supplemental items from the search results.

(A4) According some implementations of the method of A3, one supplemental item is a portion of a document address extracted from one of the matching-document digests.

(A5) According some implementations of any of methods of A3 and A4, one supplemental item is a portion of a document title extracted from one of the matching-document digests.

(A6) According some implementations of any of the methods of A3-A5, one supplemental item is a portion of a document summary extracted from one of the matching document digests.

(A7) According some implementations of any of the methods of A3-A6, the operation of appending also comprises placing separator tokens between each neighboring pair of supplemental items that make up the supplemental information.

(B1) According to a second aspect, some implementations of the technology described herein include a method (e.g., the process 902) for performing a training process. The method includes: obtaining (e.g., 904) plural sets of training examples, the plural sets of training examples being generated based on plural respective data sets; and selecting (e.g., 906) a training example from a chosen set of training examples. The training example includes: a supplemented sequence of items that includes an original sequence of items combined with supplemental information obtained from at least one source (e.g., 112), the at least one source including matching logic (e.g., 112') that maps the original sequence of items to the supplemental information; and labels that identify respective entity classes of the items in the original sequence of items. The method further includes: mapping (e.g., 908) the supplemented sequence of items into hidden state information using a transformer-based encoder machine-trained model (714'); and processing (e.g., 910) the hidden state information with a post-processing machine-trained model (718'), to produce a tagged output sequence of items, each particular item in the tagged output sequence of items having a tag that identifies a class of entity to which the particular item pertains. The post-processing machine-trained model is selected from among plural post-processing machine-trained models (e.g., 718', 720', . . . ), the plural post-processing machine-trained models being trained using plural respective sets of training examples. The method further includes: adjusting (e.g., 912) weights of the transformer-based encoder machine-trained models and the post-processing machine-trained model based on a comparison between tags in the tagged output sequence of items and the labels of the training example; and repeating (914) the operations of selecting, mapping, processing, and adjusting plural times until a training objective is achieved.

In addition to some of the benefits mentioned for A1, the method of B1 can further increase the accuracy of its models by using a multi-task architecture. The use of multi-task learning can also allow the method of B1 to converge on its training objective in less time and with reduced consumption of computing resources compared to a base case that does not use multi-task learning. This is because the method of B1 gains insight through the use of multi-task learning that would take a longer time to replicate for the case of single-task learning (B2) According some implementations of the method of B1, the supplemental information includes plural supplemental items, and wherein the training example does not assign respective entity-specific labels to the supplemental items.

(B3) According some implementations of any of the methods of B1 and B2, the supplemental information includes plural supplemental items, and wherein the training example assigns a same default label to each of the plural supplemental items.

(B4) According some implementations of any of the methods of B1-B3, the original sequence of items of the training example includes one or more text items.

(B5) According some implementations of the method of B4, the operation of obtaining supplemental information includes: obtaining search results generated by a search system for the one or more text items, the search results including a set of matching-document digests that describe documents that match the one or more text items, as determined by the search system; and selecting one or more supplemental items from the search results.

(B6) According some implementations of the method of B5, one supplemental item is a portion of a document address extracted from one of the matching-document digests.

(B7) According some implementations of any of the methods of B5 and B6, one supplemental item is a portion of a document title extracted from one of the matching-document digests.

(B8) According some implementations of any of the methods of B5-B7, one supplemental item is a portion of a document summary extracted from one of the matching document digests.

(B9) According some implementations of any of the methods of B1-B8, the transformer-based encoder machine-trained model is pre-trained, prior to the training process, based on a multilingual set of training examples.

(B10) According some implementations of any of the methods of B1-B9, the training examples in the plural sets of training examples include text expressed in a single particular natural language, the transformer-based encoder machine-trained model and the post-processing machine-trained model, once trained, also being capable of producing tagged output sequences of items for natural languages other than the particular natural language.

(B11) According some implementations of any of the methods of B1-B10, the plural post-processing machine-trained models use different respective label vocabularies.

(C1) According to a third aspect, some implementations of the technology described herein include a method (e.g., the process 802) for tagging sequences of items. The method includes: obtaining (e.g., 804) an original sequence of items from at least one source (e.g., 106) of original information; obtaining (e.g., 806) supplemental information pertaining to the original sequence of items from a search system (e.g., 112), the search system including matching logic (e.g., 112') that maps the original sequence of items to the supplemental information; appending (e.g., 808) the supplemental information to the original sequence of items, with a separator token therebetween, to produce a supplemented sequence of items; mapping (e.g., 810) the supplemented sequence of items into hidden state information using an encoder machine-trained model (e.g., 714'); processing (e.g., 812) the hidden state information with a particular post-processing machine-trained model (e.g., 718'), to produce a tagged output sequence of items, each item in the tagged output sequence of items having a tag that identifies a class of entity to which the item pertains; and providing (e.g., 816) output information that is based on the output sequence of items. The encoder machine-trained model and the particular post-processing machine-trained model are trained in a prior training process based on plural training examples. The particular post-processing machine-trained model is one of plural post-processing machine-trained models (e.g., 718', 720', . . . ) that are trained by the training process based on plural respective sets of training examples. The method of C1 shares at least some of the technical benefits of the methods of A1 and B1.

(C2) According some implementations of the method of C1, the training examples include original sequences of items that are given entity-specific labels and instances of supplemental information that lack entity-specific labels.

In yet another aspect, some implementations of the technology described herein include a computing system (e.g., computing system 1102). The computing system includes hardware logic circuitry (e.g., 1114) that is configured to perform any of the methods described herein (e.g., any individual method of the methods A1-A7, B1-B11, and C1-C2).

In yet another aspect, some implementations of the technology described herein include a computer-readable storage medium (e.g., the computer-readable storage media 1106) for storing computer-readable instructions (e.g., 1108). The computer-readable instructions, when executed by one or more hardware processors (e.g., 1104), perform any of the methods described herein (e.g., any individual method of the methods A1-A7, B1-B11, and C1-C2).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms can be configured to perform an operation using the hardware logic circuity 1014 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for tagging sequences of items, comprising:
    obtaining an original sequence of items from at least one source of original information;
    obtaining supplemental information pertaining to the original sequence of items from a search system, the search system including matching logic that maps the original sequence of items to the supplemental information;
    appending the supplemental information to the original sequence of items, with a separator token therebetween, to produce a supplemented sequence of items;
    mapping the supplemented sequence of items into hidden state information using an encoder machine-trained model;
    processing the hidden state information with a particular post-processing machine-trained model, to produce a tagged output sequence of items; and
    providing output information that is based on the output sequence of items,
    the encoder machine-trained model and the particular post-processing machine-trained model having been trained in a prior training process,
    the prior training process including:
    obtaining plural sets of training examples, the plural sets of training examples being generated based on plural respective data sets;
    selecting a training example from a chosen set of training examples, the training example including: a supplemented sequence of items that includes an original sequence of items having text combined with supplemental information obtained from the search system; and labels that identify respective entity classes of the items in the original sequence of items of the training example,
    the supplemental information associated with the training example being obtained by: obtaining search results generated by the search system for the original sequence of items having text in the training example, the search results including a set of matching-document digests that describe documents that match the original sequence of items having text, as determined by the search system; and selecting one or more supplemental items from the search results;
    mapping the supplemented sequence of items of the training example into hidden state information using the encoder machine-trained model;
    processing the hidden state information of the training example with a selected post-processing machine-trained model, to produce a tagged output sequence of items for the training example, each particular item in the tagged output sequence of items for the training example having a tag that identifies a class of entity to which the particular item pertains, the selected post-processing machine-trained model being selected from among plural post-processing machine-trained models, the plural post-processing machine-trained models being trained using the plural respective sets of training examples;
    adjusting weights of the encoder machine-trained model and the selected post-processing machine-trained model based on a comparison between tags in the tagged output sequence of items associated with the training example and the labels of the training example; and
    repeating said training process until a training objective is achieved.

2. The computer-implemented method of claim 1, wherein one supplemental item appended to the original sequence of items of the training example is a portion of a document address extracted from one of the matching-document digests.

3. The computer-implemented method of claim 1, wherein one supplemental item appended to the original sequence of items of the training example is a portion of a document title extracted from one of the matching-document digests.

4. The computer-implemented method of claim 1, wherein one supplemental item appended to the original sequence of items of the training example is a portion of a document summary extracted from one of the matching document digests.

5. The computer-implemented method of claim 1, wherein said appending also comprises placing separator tokens between each neighboring pair of supplemental items that make up the supplemental information that is appended.

6. A computing system for performing a training process, comprising:
    hardware logic circuitry, the hardware logic circuitry corresponding to: (a) one or more hardware processors that perform operations by executing machine-readable instructions stored in a memory, and/or (b) one or more other hardware logic units that perform the operations using a collection of configured logic gates, the operations including:
    obtaining plural sets of training examples, the plural sets of training examples being generated based on plural respective data sets;
    selecting a training example from a chosen set of training examples, the training example including: a supplemented sequence of items that includes an original sequence of items having text combined with supplemental information obtained from at least one source, said at least one source including matching logic that maps the original sequence of items to the supplemental information; and labels that identify respective entity classes of the items in the original sequence of items,
    the supplemental information being obtained by: obtaining search results generated by a search system for the original sequence of items having text, the search results including a set of matching-document digests that describe documents that match the original sequence of items having text, as determined by the search system; and selecting one or more supplemental items from the search results;

mapping the supplemented sequence of items into hidden state information using an encoder machine-trained model;

processing the hidden state information with a post-processing machine-trained model, to produce a tagged output sequence of items, each particular item in the tagged output sequence of items having a tag that identifies a class of entity to which the particular item pertains, the post-processing machine-trained model being selected from among plural post-processing machine-trained models, the plural post-processing machine-trained models being trained using the plural respective sets of training examples;

adjusting weights of the encoder machine-trained model and the post-processing machine-trained model based on a comparison between tags in the tagged output sequence of items and the labels of the training example; and repeating said selecting, mapping, processing, and adjusting plural times until a training objective is achieved.

7. The computing system of claim 6, wherein the training example does not assign respective entity-specific labels to the supplemental items.

8. The computing system of claim 6, wherein the training example assigns a same default label to each of the plural supplemental items.

9. The computing system of claim 6, wherein one supplemental item is a portion of a document address extracted from one of the matching-document digests.

10. The computing system of claim 6, wherein one supplemental item is a portion of a document title extracted from one of the matching-document digests.

11. The computing system of claim 6, wherein one supplemental item is a portion of a document summary extracted from one of the matching document digests.

12. The computing system of claim 6, wherein the encoder machine-trained model is a transformer-based encoder machine-trained model that is pre-trained, prior to the training process, based on a multilingual set of training examples.

13. The computing system of claim 6, wherein the training examples in the plural sets of training examples include text expressed in a single particular natural language, the transformer-based encoder machine-trained model and the post-processing machine-trained model, once trained, also being capable of producing tagged output sequences of items for natural languages other than the particular natural language.

14. The computing system of claim 6, wherein the plural post-processing machine-trained models use different respective label vocabularies.

15. A non-transitory computer-readable storage medium for storing computer-readable instructions, the computer-readable instructions, when executed by one or more hardware processors, performing a method that comprises:

obtaining an original sequence of items from at least one source of original information;

obtaining supplemental information pertaining to the original sequence of items from a search system, the search system including matching logic that maps the original sequence of items to the supplemental information;

appending the supplemental information to the original sequence of items, with a separator token therebetween, to produce a supplemented sequence of items;

mapping the supplemented sequence of items into hidden state information using an encoder machine-trained model;

processing the hidden state information with a particular post-processing machine-trained model, to produce a tagged output sequence of items; and providing output information that is based on the output sequence of items, the encoder machine-trained model and the particular post-processing machine-trained model having been trained in a prior training process, the prior training process including:

obtaining plural sets of training examples, the plural sets of training examples being generated based on plural respective data sets;

selecting a training example from a chosen set of training examples, the training example including: a supplemented sequence of items that includes an original sequence of items having text combined with supplemental information obtained from the search system; and labels that identify respective entity classes of the items in the original sequence of items of the training example, the supplemental information associated with the training example being obtained by: obtaining search results generated by the search system for the original sequence of items having text in the training example, the search results including a set of matching-document digests that describe documents that match the original sequence of items having text, as determined by the search system; and selecting one or more supplemental items from the search results;

mapping the supplemented sequence of items of the training example into hidden state information using the encoder machine-trained model;

processing the hidden state information of the training example with a selected post-processing machine-trained model, to produce a tagged output sequence of items for the training example, each particular item in the tagged output sequence of items for the training example having a tag that identifies a class of entity to which the particular item pertains, the selected post-processing machine-trained model being selected from among plural post-processing machine-trained models, the plural post-processing machine-trained models being trained using the plural respective sets of training examples;

adjusting weights of the encoder machine-trained model and the selected post-processing machine-trained model based on a comparison between tags in the tagged output sequence of items associated with the training example and the labels of the training example; and repeating said training process until a training objective is achieved.

16. The non-transitory computer-readable storage medium of claim 15, wherein the training examples include original sequences of items that are given entity-specific labels and instances of supplemental information that lack entity-specific labels.

17. The computer-implemented method of claim 1, wherein the original sequence of items is obtained from a query submitted via a user computing device.

18. The computer-implemented method of claim 1, wherein the providing output information comprises:
    identifying, using the search system, a target item that matches the tagged output sequence; and
    providing information regarding the target item.

* * * * *